United States Patent [19]
Hinde

[11] 3,813,947
[45] June 4, 1974

[54] WET SIEVING

[75] Inventor: Adrian L. Hinde, Johannesburg, South Africa

[73] Assignee: Chamber of Mines Services (Properties) Limited, Johannesburg, South Africa

[22] Filed: Jan. 4, 1973

[21] Appl. No.: 320,890

[30] Foreign Application Priority Data
Jan. 11, 1972  South Africa.................... 72/0191

[52] U.S. Cl............................................. 73/432 PS
[51] Int. Cl......................... G01n 5/04, G01n 15/00
[58] Field of Search...................... 73/432 PS, 432 R

[56] References Cited
UNITED STATES PATENTS
2,264,223  11/1941  Stancliffe.............................. 209/237
3,427,886  2/1969  Haas................................ 73/432 PS Primary Examiner—James J. Gill
Attorney, Agent, or Firm—Young & Thompson

[57] ABSTRACT

In a wet sieving process a vessel is used that has a sieving screen as a false bottom. The vessel is filled up to a predetermined level with clear water and its mass is determined. Then the vessel is filled to the same level with a slurry containing the solids to be sieved and weighed again. Fine solids and liquid are then washed through the screen with the addition of further liquid until essentially clear liquid passes through the screen. The vessel is again filled with clear liquid and its mass is determined. By means of the Archimedean principle one can then determine the mass of solids in the original sample, the mass of solids remaining after the screening process and the mass of solids which has passed through the screen.

4 Claims, 1 Drawing Figure

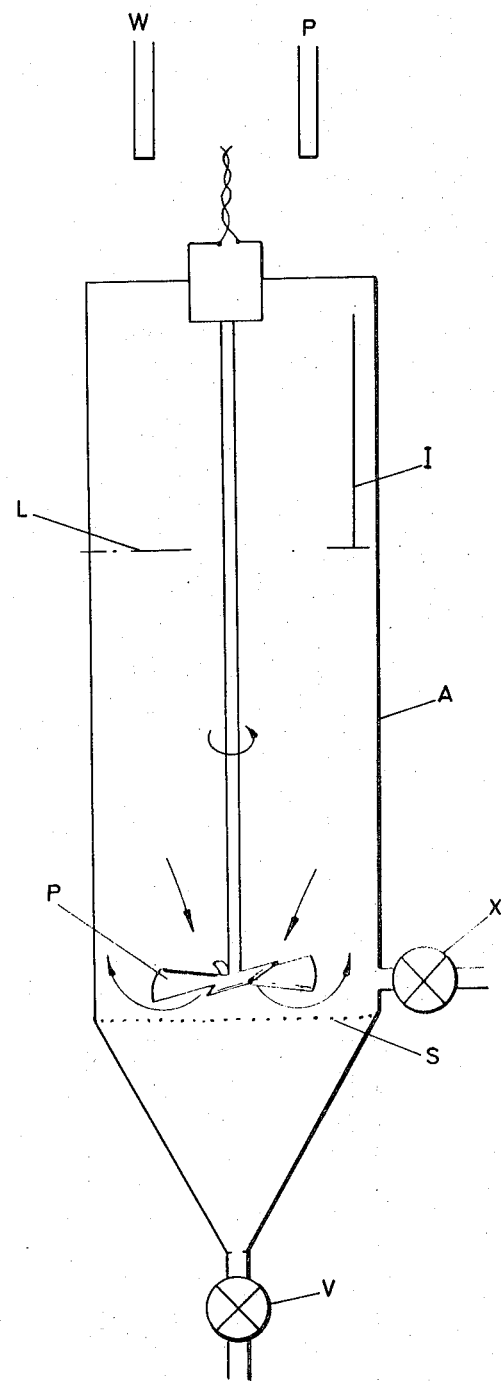

WET SIEVING

This invention relates to wet sieving techniques for determination of particle size.

The determination of particle size is most often performed by sieving. There are standard techniques of sieving such as are described in British Standard No. B.S. 1796. A slurry of particles, such as is used in mineral processing, paper-making and many other industries, may be sized by either dry or wet sieving.

In dry sieving, the slurry is dried before size analysis, and a sample of known weight is passed through a series of sieves until the finest material is caught on a tray. The weight retained on each sieve and on the final tray is then determined.

To obtain accurate results by this method, many precautions are necessary, and certain disadvantages are apparent. For instance, the slurry must be dried, which may be tedious, and the drying process may change the particle size distribution by agglomeration or dehydration. The dried material may adsorb moisture, or soluble salts in the original liquor may crystallise onto the particles. The dried material may pass only very slowly through the sieves, and in some cases be hindered further by electrostatic effects.

Thus in some cases wet sieving is to be preferred, but this method suffers from similar disadvantages in that the material retained on the various sieves must be dried after sieving, and this drying can also be tedious.

An object of the invention is to provide a method of wet sieving which is less tedious than conventional methods.

According to the invention a method of wet sieving consists in the steps of: obtaining a measure of the mass of a predetermined volume of a liquid, obtaining a measure of the mass of the same volume of a slurry composed of the liquid and the solids to be sieved, washing liquid and fine solids from that volume of slurry with the aid of further liquid through sieve openings of a predetermined size until essentially clear liquid passes through, making up the retained portion of the slurry to the predetermined volume by the addition of liquid, and obtaining a measure of the mass of the thus made up slurry.

From the measures of mass thus obtained it is possible to determine by using the Archimedean principle any or all of the mass of solids in the original sample, the mass of solids remaining after the screening process and the mass of solids which has passed through the screen.

If size ranges are to be determined the same sample of solids may be treated on successively coarser screens.

In order to speed up the sieving known methods of agitation such as ultrasonics, shaking the vessel which is used and oscillation of the liquid column during sieving may be used. However in the preferred form of the invention the slurry is stirred close to the sieve openings.

An example of the method is described with reference to the drawing. A vessel A is filled to a known level L, given by the level indicator I, with water via W, the valves V and X being shut. The vessel is then weighed (let this weight be $W_w$). The level of water is then lowered to the vicinity of the screen S containing apertures of known size, by opening either or both valves V or X. The valves are then closed, and the slurry to be sized is admitted via P to the level L. The vessel is again weighed (let this weight be $W_B$). The valve V is then opened, and water is admitted via W to wash particles finer than the screen through the screen. Once all particles which can do so have passed through the screen, as shown by the conveyance of essentially clear water from the valve V, the valve V is closed and water is added via W up to L. The vessel is weighed a third time (let this weight be $W_A$). Then, by conventional physical principles (Archimedes' principle), the weight of solids added initially to the vessel is $(W_B - W_w)/(1 - pw/ps)$ where $pw$ and $ps$ are the specific gravities of water and solids to be sized, respectively. Similarly, the weight of solids remaining after the fine material has been washed out is given by $(W_A - W_w)/(1 - pw/ps) = P$. Thus the fraction of solids coarser than the screen is given by $(W_A - W_w)/(W_B - W_w)$. On completion of sieving and weighing a sample, the solids coarser than the screen may be flushed out of the vessel A through the valve X.

As an example of the use of the method, a number of samples were sized by conventional techniques and also sized by the method described above. The results are given in the table. Also shown in the table is the time for sieving when the slurry in the vicinity of the screen was agitated by a propeller P, as is shown in the drawing. The use of a propeller to increase the speed of wet sieving in this fashion has not been described previously. The speed of sieving and particle size determination given in this table indicates that the method is suitable for semi-continuously monitoring the particle size distribution of process streams.

Screen mesh size: 44 μm

| Size analysis conventional method (dry sieving) | Size analysis new method | New method sieving time (mins) |
|---|---|---|
| 23.5% — 44 μm | 23.7% — 44 μm | 5 |
| 39.9% — 44 μm | 40.4% — 44 μm | 5 |
| 51.8% — 44 μm | 50.8% — 44 μm | 10 |
| 63.5% — 44 μm | 64.4% — 44 μm | 10 |
| 71.2% — 44 μm | 74.0% — 44 μm | 10 |
| 86.1% — 44 μm | 84.4% — 44 μm | 15 |

I claim:

1. A method of sieving consisting in the steps of:
obtaining a measure of the mass of a predetermined volume of a liquid,
obtaining a measure of the mass of the same volume of a slurry composed of the liquid and the solids to be sieved, washing liquid and fine solids from that volume of slurry with the aid of further liquid through sieve openings of a predetermined size until essentially clear liquid passes through,
making up the retained portion of the slurry to the predetermined volume by the addition of liquid, and obtaining a measure of the mass of the thus made up slurry.

2. The method claimed in claim 1 including the step of determining the mass of solids remaining after the screening process by using the Archimedean principle.

3. The method claimed in claim 1 in which passage through the screen is speeded up by agitation.

4. The method claimed in claim 3 in which agitation is by stirring the slurry close to the screen openings.

* * * * *